United States Patent [19]

Falcon-Steward

[11] 4,278,208

[45] * Jul. 14, 1981

[54] COMMINUTION OF MATERIALS

[75] Inventor: Hugh R. Falcon-Steward, St. Austell, England

[73] Assignee: English Clays Lovering Pochin & Co., Ltd., St. Austell, England

[*] Notice: The portion of the term of this patent subsequent to Sep. 4, 1996, has been disclaimed.

[21] Appl. No.: 60,198

[22] Filed: Jul. 24, 1979

Related U.S. Application Data

[63] Continuation-in-part of Ser. No. 865,242, Dec. 28, 1977, Pat. No. 4,166,582.

[30] Foreign Application Priority Data

Jan. 19, 1977 [GB] United Kingdom ................ 2185/77

[51] Int. Cl.³ ............................................. B02C 23/18
[52] U.S. Cl. ...................................... 241/16; 241/24
[58] Field of Search ............................. 241/16, 21, 24

[56] References Cited

U.S. PATENT DOCUMENTS

| | | | |
|---|---|---|---|
| 3,097,801 | 7/1963 | Duke | 241/16 |
| 3,253,791 | 5/1966 | Cohn et al. | 241/16 X |
| 3,604,634 | 9/1971 | Windle | 241/16 |
| 3,754,712 | 8/1973 | Cecil | 241/16 |
| 3,934,825 | 1/1976 | Delfosse et al. | 241/16 |
| 3,989,195 | 11/1976 | Falcon-Steward | 241/16 |

*Primary Examiner*—Howard N. Goldberg
*Attorney, Agent, or Firm*—Weingram & Klauber

[57] ABSTRACT

A method of comminuting a solid material comprising calcium carbonate to obtain a product containing at least 60% by weight of particles smaller than 2 microns equivalent spherical diameter is disclosed. The method comprises forming an aqueous suspension of the solid material which has a solids content of up to 50% by weight and contains a dispersing agent, comminuting the solid material in the suspension by agitating the suspension in admixture with a particulate grinding medium, separating from the suspension thereby obtained an aqueous suspension containing comminuted solid material, classifying the latter suspension to obtain an aqueous suspension of a fine product which contains at least 60% by weight of particles smaller than 2 microns equivalent spherical diameter, flocculating the fine product by means of an electrolyte having a multivalent cation, and dewatering the aqueous suspension containing the comminuted and flocculated fine product.

15 Claims, 2 Drawing Figures

COMMINUTION OF MATERIALS

RELATED APPLICATIONS

This application is a continuation-in-part of my co-pending application Ser. No. 865,242 filed Dec. 28th, 1977, now U.S. Pat. No. 4,166,582, and entitled improvements in or relating to the comminution of materials.

BACKGROUND OF THE INVENTION

This invention relates to the comminution of solid material and, more particularly, is concerned with the comminution of solid materials comprising calcium carbonate.

It is known that the product obtained on comminuting a solid material comprises particles of sizes which vary over a wide range and which follow a distribution curve which approximates to a Gaussian distribution. As a result, if it is desired to comminute a solid material to produce a product substantially all of which consists of particles smaller than a given size, the product will inevitably contain a large proportion of particles which are very much finer than the given size and many particles which may be undesirably fine for the purpose for which the ground product is required. Also a considerable quantity of energy is wasted in the comminution process in producing the large proportion of particles which are very much finer than is required. The problems outlined above may be overcome by subjecting the product of the comminution process to a particle size classification step, the fine product of the classification step being returned for further grinding. In this manner it is possible to avoid the production of large proportions of undesirably fine material and the consumption of large amounts of energy in producing a product substantially all of which consists of particles smaller than a given size. When, however, the solid material to be comminuted comprises calcium carbonate problems arise in practising the process of comminution followed by a particle size classification step as outlined above.

Much ground calcium carbonate material is used as a pigment in paper coating compositions and for this purpose is required in the form of a highly concentrated, deflocculated aqueous suspension having a solids content ranging from about 65 to about 80% by weight. Since natural calcium carbonate occurs in a dry or substantially dry state (i.e. containing not more than about 20% by weight of water) it is convenient to comminute the calcium carbonate in the form of a high solids content, deflocculated aqueous suspension as is described, for example, in U.S. Pat. Nos. 3,604,634 and 3,995,817 and in U.S. Pat. application Ser. No. 73,880, filed Sept. 10, 1979, as a continuation of Ser. No. 880,875, now abandoned. The product obtained by comminuting at a high solids concentration in this manner may be subjected to a particle size classification by means of certain special types of centrifuge, as is described in U.S. Patent Application Ser. No. 927,360, but such centrifuges tend to be costly and a considerable amount of energy is required to remove from the centrifuge the extremely viscous coarse product of the classification.

An alternative to comminuting and classifying a calcium carbonate material as a high solids content suspension is to perform these operations at a much lower solids concentration, but this has the disadvantage that water must be added to the suspension of calcium carbonate material in order to form the low solids suspension and then removed from the ground product to bring the latter into a saleable form. Also, if the suspension is to be dewatered by filtration or centrifugation it is essential for the formation of a good dewatered product of relatively low water content that the suspension should be in the flocculated state. This generally means that a chemical flocculant must be added, and this increases the cost of the process. Also, it has been found that it is often extremely difficult to redisperse or deflocculate again a finely ground natural calcium carbonate which has previously been flocculated in the conventional manner.

In my U.S. Patent Application Ser. No. 865,242 now U.S. Pat. No. 4,166,582, I have disclosed a method of comminuting a solid material comprising calcium carbonate to obtain a comminuted solid material containing at least 60% by weight of particles smaller than 2 microns equivalent spherical diameter, in which method (a) an aqueous suspension of the solid material is formed having a solids content in the range of from 5% to 50% by weight of dry solids and containing sufficient dispersing agent to prevent the formation of agglomerates during the subsequent comminution of the solid material; (b) the solid material in the suspension formed in step (a) is comminuted by agitating the suspension in admixture with a particulate grinding medium which consists of particles not larger than about 10 mm and not smaller than about 0.15 mm; (c) an aqueous suspension containing comminuted solid material at least 60% by weight of which is smaller than 2 microns equivalent spherical diameter is separated from the product of step (b); (d) the comminuted solid material in the separated aqueous suspension is flocculated (if not already in a flocculated condition) by means of an electrolyte having a multivalent cation; and (e) the aqueous suspension containing the comminuted and flocculated solid material is dewatered. This method makes it possible to comminute a solid material comprising calcium carbonate in an aqueous suspension at a relatively low solids content and to flocculate and dewater the suspension in such a manner that the dewatered and comminuted solid material may be deflocculated easily and at the expense of only a small quantity of dispersing agent.

I have now found that it is possible to incorporate into the method described in my U.S. Patent Application Ser. No. 865,242, now U.S. Pat. No. 4,166,582 an additional particle size classification step in order to save energy and to avoid the production of a large proportion of undesirably fine particles.

SUMMARY OF THE INVENTION

According to the present invention I provide a method of comminuting a solid material comprising calcium carbonate to obtain a comminuted solid material containing at least 60% by weight of particles smaller than 2 microns equivalent spherical diameter, which method comprises the steps of:

(a) forming an aqueous suspension of the solid material which has a solids content in the range of from 5% to 50% by weight of dry solids, is substantially free of large particles and contains sufficient dispersing agent to prevent the formation of agglomerates during the subsequent comminution of the solid material;

(b) comminuting the solid material in the suspension formed in step (a) by agitating the suspension in admixture with a particulate grinding medium which consists of particles not larger than about 20 mm and not smaller than about 0.15 mm;

(c) separating from the product of step (b) an aqueous suspension containing comminuted solid material;

(d) subjecting the aqueous suspension containing comminuted solid material to a particle size classification so as to produce a fine product at least 60% by weight of which consists of particles having an equivalent spherical diameter smaller than 2 microns, and a coarse product which advantageously is subjected to further comminution;

(e) flocculating the fine product of step (d), if it is not presently in a flocculated condition, by means of an electrolyte having a multivalent cation; and (f) dewatering the aqueous suspension containing the comminuted and flocculated solid material.

The dewatered solid material obtained as the product of step (f) can either be thermally dried or be mixed with a small quantity of a dispersing agent to form a fluid suspension of good rheological stability.

In step (a) the solid material in the aqueous suspension is preferably substantially free of particles larger than 10 mm. Most preferably, the solid material consists of particles smaller than 1 mm. A solid material in suitable sizes can be obtained by a preliminary comminution which may be performed by mean of apparatus such as a jaw, cone or gyratory crusher or a hammer, ball or rod mill or by means of a process such as that described in Belgian Pat. No. 848,876. The solids content of the aqueous suspension of the solid material should be in the range 5% to 50% by weight of dry solids. If the aqueous suspension has a solids content below 5% by weight the grinding efficiency of step (b) is unacceptably low and the volume of the aqueous suspension which has to be handled per unit weight of dry solids is unacceptably high. If the solids content of the aqueous suspension is above 50% by weight, the aqueous suspension, when in the flocculated condition, would be extremely viscous and difficult to dewater. Preferably, the solids content of the aqueous suspension formed in step (a) is adjusted to lie in the range of from 20% to 45% by weight. The dispersing agent may be, for example, a water-soluble salt of a polyphosphoric acid, a water-soluble salt or a polysilicic acid or, preferably, an organic polymeric dispersing agent, such as water-soluble salt of a polyacrylic acid or polymethacrylic acid or a water-soluble copolymer of the type described in British Patent Specification No. 1,414,964. The amount of dispersing agent required is that which is just sufficient to confer negative charges on substantially all of the new crystal surfaces which are formed by the fracture of particles during the comminution step. It is believed that a new surface which is formed normally carries both positive and negative charges and therefore, in the absence of the dispersing agent, newly fractured particles tend to attract one another and form agglomerates which are not broken down if the comminuted mineral is subsequently treated with a dispersing agent. In the case of the water-soluble salts of polyacrylic acid or polymethacrylic acid or the organic copolymer dispersing agents disclosed in British Patent Specification No. 1,414,964, the amount of dispersing agent required is not more than 0.2% by weight based on the weight of dry material. Generally in the case of hard calcium carbonate materials, such as marble, vein calcite, limestone or dolomite, the amount of dispersing agent required is about 0.15% by weight and in the case of natural chalk the amount of dispersing agent required is about 0.1% by weight, based on the weight of the dry material.

In step (b) of the method of the invention the particulate grinding medium preferably consists of particles not larger than about 7 mm and not smaller than about 0.25 mm. The grinding medium may be formed of a harder material than the solid material to be ground; for example, it may consist of approximately spherical particles of silica sand. Alternatively, the particulate grinding medium may be formed of the same material as, or a similar material to, the solid material to be ground. For example it may consist or particles of vein calcite, limestone or marble.

In step (c) of the method of the invention the separation from the product of step (b) of an aqueous suspension containing comminuted solid material can be effected by elutriation or by means of a sieve.

Thus steps (b) and (c) of the method of the invention can be conveniently carried out by agitating the aqueous suspension of the solid material and the particulate grinding medium in a vessel which is provided with an impeller mounted on a central, upright shaft and with a sieve in the side of the vessel which allows particles to pass which have been sufficiently finely ground but retains coarser particles in the vessel. The aperture size of this sieve is conveniently about one half of the diameter of the smallest particles which are present in the particulate grinding medium. For example if the smallest particles of the particulate grinding medium have a diameter of 0.5 mm. the sieve will have an aperture size of 0.25 mm.

In step (d) of the method of the invention the particle size classification may be performed by means of a centrifuge or by gravitational sedimentation, but most conveniently is achieved by the use of one or more hydraulic cyclones. Hydraulic cyclones are generally of conical or frusto-conical shape and for use in the method of the invention are preferably of small diameter. Most preferably the greatest diameter of the cyclone is in the range of from about 2 cm to about 6 cm. The pressure and solid content of the aqueous suspension supplied to the hydraulic cyclones and the diameters of the vortex finder and of the spigot of the hydraulic cyclones are chosen to give a fine product at least 60% by weight of which consists of particles having an equivalent spherical diameter smaller than 2 microns. The coarse product from the hydraulic cyclones may be returned to the grinding vessel used in step (b) or it may be subjected to further comminution in a separate grinding apparatus.

In step (e) of the method of the invention it is preferred not to add a flocculant. If the quantity of the dispersing agent used in step (a) has been correctly determined, the comminuted solid material will be in a weakly flocculated condition on completion of comminution because the new surfaces formed by the fracture of particles during comminution will have completely absorbed all the dispersing agent which is present. If, however, after comminution the solid material is still in a deflocculated condition and a flocculent has to be added, the preferred flocculants are electrolytes containing calcium or aluminium ions, for example calcium chloride, aluminium sulphate or calcium hydroxide. The flocculant used should be one which has a reversible effect. Polymeric flocculants, such as polyacrylamide and its derivatives have been found to be unsuitable for use in the present invention because they flocculate the ground material too strongly. The amount of flocculant used should be the minimum which will bring about flocculation. If the amount of dispersing agent added in step (a) is judged correctly so that the comminuted solid material is weakly flocculated at the completion of comminution, not only is the cost of the flocculant avoided but also the quantity of dispersing agent necessary to form a deflocculated suspension of the material at a high solids content after the dewatering operation is greatly reduced.

In step (f) of the method of the invention the suspension containing the flocculated solid material is preferably dewatered by filtration but other methods such as gravitational or centrifugal sedimentation may also be used.

If a fluid suspension at high solids content is required the cake of dewatered material formed in step (f) is mixed with a small quantity of a dispersing agent. The dispersing agent used can be the same as that used in step (a). The dispersing agent is generally added as an aqueous solution. It is possible to add it in powder form but most dispersing agents are so hygroscopic that they are not easily metered in powder form. Additional water is not necessary in order to form a fluid suspension. For example, a powdered dispersing agent can be mixed with a filterpress cake and a fluid suspension obtained with the water present in the filterpress cake as soon as adequate mixing has taken place. Any liquid-solid mixer can be used; and a relatively slow speed mixer such as a blunger is suitable for this purpose. Even if the comminuted solid material is left in dewatered form the customer will generally wish to use it in the form of a deflocculated suspension at a high solids content, for example as a paper coating pigment or as a pigment or extender for emulsion paints, and it is therefore important that the comminuted material should have good rheological properties as a deflocculated aqueous suspension. In the case of the polyacrylate, polymethacrylate and copolymeric dispersing agents mentioned above the quantity of additional dispersing agent is usually such that the total amount of dispersing agent used in step (a) and in this operation does not exceed about 0.4% by weight based on the weight of dry material.

Solid materials which may be treated by the method of the invention include minerals which are formed from calcium carbonate, for example limestone, vein calcite, calcite marble or chalk; minerals which are formed from calcium carbonate and a substantial proportion of other materials, for example dolomite; mixtures of calcium carbonate minerals and other minerals such as clay and talc; and other materials comprising calcium carbontate, for example oyster or other marine shells rich in calcium carbonate.

Figure 1:
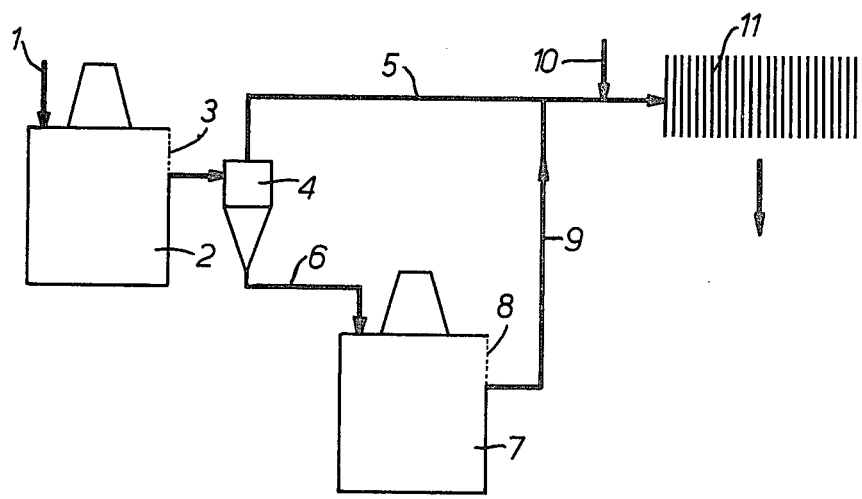
FIGS. 1 and 2 show schematically two different ways in which the method of the invention can be performed.

Referring first to FIG. 1, an aqueous suspension of a solid material to be comminuted having a solids content in the range of from 5% to 50% by weight of dry solids and being substantially free of large particles was fed at 1 into an attrition grinding mill 2 containing a particulate grinding medium consisting of particles ranging in size from 0.15 mm to 20.00 mm. An aqueous suspension of the comminuted product flowed through a sieve 3 and was fed under pressure tangentially into one or more hydraulic cyclones 4. The operating conditions for the or each hydraulic cyclone were such that a suspension comprising comminuted material at least 60% by weight of which consisted of particles having an equivalent spherical diameter smaller than 2 microns passed up the vortex finder of the cyclone and left through a conduit 5, and a suspension of coarser particles was discharged through the spigot of the hydraulic cyclone and passed through a conduit 6 to a second attrition grinding mill 7.

An aqueous suspension of comminuted material flowed through a sieve 8 and passed through a conduit 9 which joined conduit 5. The combined products of the two attrition grinding mills was dewatered in a filter-press 11, a flocculant in the form of an electrolyte having a multivalent cation being added at 10 if necessary.

Figure 2:
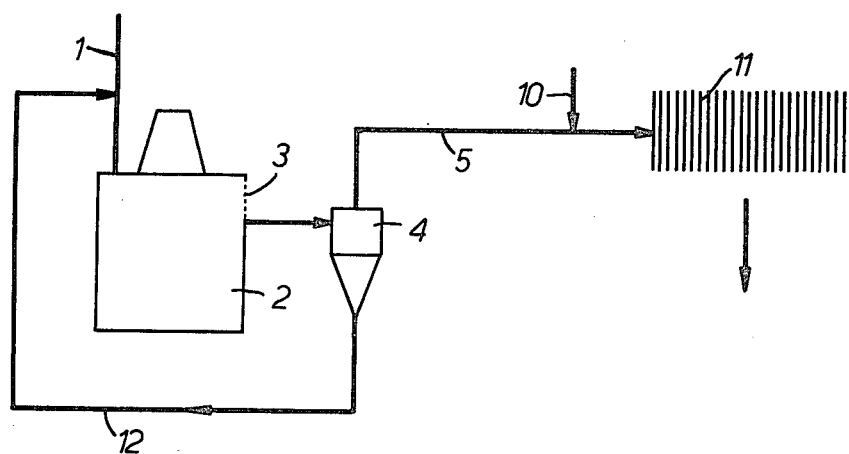

Referring now to FIG. 2, the aqueous suspension was subjected to attrition grinding and the suspension of comminuted material fed to the hydraulic cyclone(s) in the same way as described above in connection with the FIG. 1 embodiment, but the coarse product of the hydraulic cyclone(s) was recycled through a conduit 12 and was combined with the feed to the attrition grinder. As in the FIG. 1 embodiment the suspension of the fine product, comprising at least 60% by weight of particles having an equivalent spherical diameter smaller than 2 microns, flowed through the conduit 5 to the filter press 11 where is was dewatered.

The invention is further illustrated by the following Examples.

EXAMPLE 1

Marble chippings from Carrara, Italy were crushed in a roll mill and screened on a No. 14 mesh B.S. sieve (nominal aperture 1.2 mm). The material passing through the sieve was mixed with water to form a slurry containing 40% by weight of dry marble and this suspension was subjected to pebble milling for 2 hours with 40 mm flint pebbles. The pebble milled marble was found to have a particle size distribution such that 0.56% by weight consisted of particles larger than 53 microns, 54% by weight consisted of particles having an equivalent spherical diameter larger than 10 microns and 16% by weight consisted of particles having an equivalent spherical diameter smaller than 2 microns.

The suspension of pebble milled marble was treated with 0.20% by weight, based on the weight of dry marble, of a sodium polyacrylate dispersing agent and agitated in a sand grinding mill with silica sand having particles of sizes in the range from 0.5 to 1.0 mm. The suspension of the sand ground product was then diluted with water and subjected to particle size classification by gravitational sedimentation. The coarse fraction was subjected to further sand grinding under identical conditions to those described above, and the sand ground product was blended with the fine fraction from the particle size classification as the final product.

The proportions by weight of particles having an equivalent spherical diameter larger than 10 microns and smaller than 2 microns were measured for each of the product of the first sand grinding stage, the fine and coarse products of the particle size classification, the product of the second sand grinding and the final blended product, and the results are set forth in Table I below. The recovery or percentage by weight of the starting material which is present in each of the products is also shown.

TABLE I

|  | 1st sand grinder product | Fine fraction | Coarse fraction | 2nd sand grnder product | Blended product |
|---|---|---|---|---|---|
| % by wt. larger than 10 μm esd. | 4 | 0.02 | 16 | 1.8 | 0.45 |
| % by wt. smaller than 2 μm esd. | 83 | 97 | 19 | 72 | 91 |
| Recovery | 100 | 76.1 | 23.9 | 23.9 | 100 |

The energy dissipated per unit weight of dry ground marble in the blended product in the two sand grinding stages was 183 horsepower hours per ton.

As a comparison, a second portion of the slurry of pebble milled marble was ground in the presence of 0.20% by weight of dispersing agent until the marble had a particle size distribution such that 0.6% by weight consisted of particles having an equivalent spherical diameter larger than 10 microns and 90% by weight consisted of particles having an equivalent spherical diameter smaller than 2 microns. The energy dissipated per unit weight of dry ground marble in this case was 200 horsepower hours per ton. Both final products were dewatered by filtration, after adding a small quantity of calcium chloride as a flocculant, and in each case the dewatered product could easily be redispersed to form a fluid suspension of high solids content by mixing the dewatered product with a small additional quantity of the sodium polyacrylate dispersing agent.

EXAMPLE 2

Example 1 was repeated except that in this case the duration of the first sand grinding stage was shorter so that the product of this stage was coarser. The results obtained are set forth in Table II below.

TABLE II

|  | 1st sand grinder product | Fine fraction | Coarse fraction | 2nd sand grinder product | Blended product |
|---|---|---|---|---|---|
| % by wt. larger than 10 μm esd. | 14 | 0.2 | 30 | 2 | 0.87 |
| % by wt. smaller than 2 μm esd. | 57 | 90 | 4 | 89 | 90 |
| Recovery | 100 | 62.7 | 37.3 | 37.3 | 100 |

The energy dissipated, per unit weight of dry ground marble in the blended product, in the two sand grinding stages was 151 horsepower hourse per ton, compared with an energy consumption of 200 horsepower hours per ton required to produce an equivalent product by sand grinding alone.

The blended product was flocculated with a small amount of calcium chloride, dewatered by filtration and it was found that the dewatered material could easily be redispersed to form a fluid suspension of high solids content by mixing the dewatered product with a small additional quantity of the dispersing agent.

EXAMPLE 3

A further portion of the suspension of pebble milled marble which was used in Examples 1 and 2 was subjected to comminution in apparatus comprising a sand grinding mill in closed circuit with an hydraulic cyclone as shown in FIG. 2. The sand grinding mill and the particulate grinding medium were the same as that described in Example 1 and the suspension of pebble milled marble was treated with 0.15% by weight, based on the weight of dry marble, of the sodium polyacrylate dispersing agent. The hydraulic cyclone had a largest internal diameter of 1 inch, a vortex finder diameter of 3/16 inch and a spigot diameter of 3/16 inch.

The suspension of sand ground marble was diluted with water to a solids content of 22% by weight and was fed to the hydraulic cyclone at a pressure of 80 psig. The proportions by weight of particles having an equivalent spherical diameter larger than 10 microns and smaller than 2 microns were measured for the sand grinder product and the coarse and fine fractions from the hydraulic cyclone and the recoveries in the coarse and fine fractions were also determined. The results obtained are set forth in Table III below.

TABLE III

|  | Sand grinder product | Fine fraction | Coarse fraction |
|---|---|---|---|
| % by wt. larger than 10 μm esd. | 19 | 2 | 23 |
| % by wt. smaller than 2 μm esd. | 41 | 66 | 32 |
| Recovery | 100 | 24.9 | 75.1 |

The energy dissipated in the sand grinder was 65 horsepower hours per ton of ground marble, compared with 103 horsepower hours per ton which would be required to grind the marble directly to a particle size distribution such that 66% by weight consisted of particles having an equivalent spherical diameter smaller than 2 microns.

EXAMPLE 4

The experiment of Example 3 was repeated except that the spigot diameter of the hydraulic cyclone was changed to ⅛ inch (3.2 mm). The results obtained are set forth in Table IV below.

TABLE IV

|  | Sand grinder product | Fine fraction | Coarse fraction |
|---|---|---|---|
| % by wt. larger than 10 μm esd. | 20 | 1 | 35 |
| % by wt. smaller than 2 μm esd. | 38 | 62 | 20 |
| Recovery | 100 | 42.9 | 57.1 |

The energy dissipated in the sand grinder was 58 horsepower hours per ton of ground marble compared with 91 horsepower hours per ton which would be required to grind the marble directly to the particle size distribution of the fine fraction.

EXAMPLE 5

The experiment of Example 3 was repeated except that the residence time of the suspension in the sand grinder was adjusted to give a finer grind. The suspension of sand ground marble was diluted with water to a solids content of 23% by weight. The results obtained are set forth in Table V below.

TABLE V

|  | Sand grinder product | Fine fraction | Coarse fraction |
|---|---|---|---|
| % by wt. larger than 10 μm esd. | 6 | 0.06 | 13 |
| % by wt. smaller than 2 μm esd. | 71 | 81 | 56 |
| Recovery | 100 | 56.2 | 43.8 |

The energy dissipated in the sand grinder was 146 horsepower hours per ton of ground marble compared with 160 horsepower hours per ton which would be required to grind the marble directly to the particle size distribution of the fine fraction.

EXAMPLE 6

The experiment of Example 5 was repeated except that the spigot diameter of the hydraulic cyclone was changed to ⅛ inch and the suspension of sand ground marble was not diluted, but was fed to the hydraulic cyclone at a solids content of 39% by weight. The results obtained are set forth in Table VI below.

TABLE VI

|  | Sand grinder product | Fine fraction | Coarse fraction |
|---|---|---|---|
| % by wt. larger than 10 μm esd. | 5 | 0.9 | 20 |
| % by wt. smaller than 2 μm esd. | 69 | 76 | 55 |
| Recovery | 100 | 71.3 | 8.7 |

The energy dissipated in the sand grinder was 133 horsepower hours per ton of ground marble compared with 142 horsepower hours per ton which would be required to grind the marble directly to the particle size distribution of the fine fraction.

EXAMPLE 7

The experiment of Example 6 was repeated except that the suspension of sand ground marble was diluted with water and fed to the hydraulic cyclone at a solids content of 23% by weight. The results obtained are set forth in Table VII below.

TABLE VII

|  | Sand grinder product | Fine fraction | Coarse fraction |
|---|---|---|---|
| % by wt. larger than 10 μm esd. | 6 | 0.1 | 18 |
| % by wt. smaller than 2 μm esd. | 68 | 79 | 48 |
| Recovery | 100 | 70.6 | 29.4 |

The energy dissipated in the sand grinder was 133 horsepower hours per ton of ground marble compared with 153 horsepower hours per ton which would be required to grind the marble directly to the particle size distribution of the fine fraction.

The fine fraction produced in each of Examples 3 to 7 was flocculated with a small quantity of calcium chloride and dewatered by filtration. In each case it was found that the dewatered material could easily be redispersed to form a fluid suspension of high solids content by mixing the dewatered product with a small additional quantity of the dispersing agent.

I claim:

1. A method of comminuting a solid material comprising calcium carbonate to obtain a comminuted solid material which contains at least 60% by weight of particles smaller than 2 microns equivalent spherical diameter, and which is readily redispersible in water to form a high solids fluid suspension, which method comprises the steps of:
    (a) forming an aqueous suspension of the solid material which has a solids content in the range of from 5% to 50% by weight of dry solids, is substantially free of particles larger than 10 mm, and contains sufficient dispersing agent to prevent the formation of agglomerates during the subsequent comminution of the solid material;
    (b) comminuting the solid material in the suspension formed in step (a) by agitating the suspension in admixture with a particulate grinding medium which consists of particles not larger than about 20 mm and not smaller than about 0.15 mm;
    (c) separating from the product of step (b) an aqueous suspension containing comminuted solid material;
    (d) subjecting the aqueous suspension containing comminuted solid material to a particle size classification so as to obtain an aqueous suspension of a fine product at least 60% by weight of which consists of particles smaller than 2 microns equivalent spherical diameter, and a coarse product; and
    (e) dewatering the aqueous suspension containing the comminuted fine product, while said product is in a flocculated state brought about by counteracting the effects of said dispersing agent, but without the addition of polymeric flocculants; whereby to facilitate both said dewatering and subsequent formation from said comminuted product of a high solids deflocculated suspension.

2. A method in accordance with claim 1, wherein the effects of said dispersing agent are at least partially counteracted by said agent being adsorbed on new surfaces formed by the fracture of the particles of said solid material during said comminution.

3. A method in accordance with claim 1, wherein the effects of said dispersing agent are at least partially counteracted by addition to said fine product suspension of a flocculant comprising an electrolyte having a multivalent cation.

4. A method according to claim 1, wherein said coarse product is further comminuted.

5. A method according to claim 4, wherein said coarse product is further comminuted by being recycled for comminution with more solid material in step (b).

6. A method according to claim 4, wherein said coarse product is further comminuted separately from material being comminuted in step (b), and then blended with said fine product.

7. A method according to claim 1, wherein the aqueous suspension containing comminuted solid material is subjected to a particle size classification in a hydraulic cyclone.

8. A method of comminuting a solid material comprising calcium carbonate to obtain a comminuted solid material which contains at least 60% by weight of particles smaller than 2 microns equivalent spherical diameter and which is readily redispersible in water to form a fluid suspension, which method comprises the steps of:
    (a) forming an aqueous suspension of the solid material which has a solids content in the range of from 5% to 50% by weight of dry solids, is substantially free of particles larger than 10 mm, and contains sufficient dispersing agent to prevent the formation of agglomerates during the subsequent comminution of the solid material;
    (b) comminuting the solid material in the suspension formed in step (a) by agitating the suspension in admixture with a particulate grinding medium which consists of particles not larger than about 20 mm and not smaller than about 0.15 mm;
    (c) separating from the product of step (b) an aqueous suspension containing comminuted solid material;

(d) subjecting the aqueous suspension containing comminuted solid material to a particle size classification so as to obtain an aqueous suspension of a fine product at least 60% by weight of which consists of particles smaller than 2 microns equivalent spherical diameter, and a coarse product;

(e) flocculating the fine product in the separated aqueous suspension of the fine product by means of an electrolyte having a multivalent cation; and (f) dewatering the aqueous suspension containing the comminuted and flocculated fine product, to obtain the desired comminuted solid material.

9. A method according to claim 8, wherein said coarse product is further comminuted.

10. A method according to claim 9, wherein said coarse product is further comminuted by being recycled for comminution with more solid material in step (b).

11. A method according to claim 9, wherein said product is further comminuted, separately from said material being comminuted in step (b), and then blended with said fine product.

12. A method according to claim 8, wherein the aqueous suspension containing comminuted solid material is subjected to a particle size classification by gravitational sedimentation.

13. A method according to claim 8, wherein the aqueous suspension containing comminuted solid material is subjected to a particle size classification by centrifugal sedimentation.

14. A method of comminuting a solid material comprising calcium carbonate to obtain a comminuted solid material which contains at least 60% by weight of particles smaller than 2 microns equivalent spherical diameter, and which is readily redispersible in water to form a high solids fluid suspension, which method comprises the steps of:

(a) forming an aqueous suspension of the solid material which has a solids content in the range of from 5% to 50% by weight of dry solids, is substantially free of particles larger than 10 mm, and contains sufficient dispersing agent to prevent the formation of agglomerates during the subsequent comminution of the solid material;

(b) comminuting the solid material in the suspension formed in step (a) by agitating the suspension in admixture with a particulate grinding medium which consists of particles not larger than about 20 mm and not smaller than about 0.15 mm;

(c) separating from the product of step (b) an aqueous suspension containing comminuted solid material;

(d) subjecting the aqueous suspension containing comminuted solid material to a particle size classification so as to obtain an aqueous suspension of a fine product at least 60% by weight of which consists of particles smaller than 2 microns equivalent spherical diameter, and a coarse product; and (e) dewatering the aqueous suspension containing the comminuted fine product, while said product is in a flocculated condition brought about without the addition of flocculants; said flocculated condition facilitating said dewatering, and the absence of added flocculants facilitating subsequent formation from said comminuted product of a high solids deflocculated suspension.

15. A method in accordance with claim 14, wherein the aqueous suspension of step (a) has a solids content in the range of from 20 to 45%, and contains from 0.1 to 0.2% by weight of the dry solids of an organic polymeric dispersing agent.

* * * * *